United States Patent Office 2,917,428
Patented Dec. 15, 1959

2,917,428

BACTERICIDAL COMPOSITION COMPRISING TETRA ALKYL QUATERNARY AMMONIUM HALIDE AND HYDROGEN PEROXIDE

Donald O. Hitzman, Bartlesville, Okla., assignor to Phillips Petroleum Company, a corporation of Delaware No Drawing. Application January 3, 1956
Serial No. 556,797

6 Claims. (Cl. 167—22)

This invention relates to bactericides. In one aspect it relates to bactericidal compounds which are effective when added to water. In another aspect it relates to water containing the selected bactericides in effective amounts, which water is useful for many purposes requiring water in which bacteria do not multiply. In another aspect it relates to the use of such water for the recovery of oil from oil sands by displacing the oil with said water.

Bactericides for use in water to produce sterile water, or water in which bacteria, microbes, fungi, yeasts, and other like microorganisms will not multiply, are useful in many commercial applications. They are especially useful in the art of producing oil, and/or gas, from earth formations containing the same, by displacing the same with water. In these well operations it has been found very difficult to maintain the process if sulfate reducing and/or other anaerobic bacteria are present in the water employed.

The success, or failure, of a water flood of an earth formation may rest on the ability of the operator to control the growth of sulfate reducing bacteria in his injection water. These organisms cause corrosion of the well pipe by accelerating galvanic corrosion. Still more serious is their ability to rapidly reduce sulfates present in the injection water to sulfides, which react with the soluble iron salts in the water to form insoluble iron sulfide, which causes serious plugging of the formation into which the water is being injected.

Considerable efforts have been made in the prior art to control such bacteria and other microorganisms in the water used for these purposes, but the amounts of bactericide necessary have been excessive from an economical standpoint, and the effectiveness of the proposed bactericides has been poor, especially as to sulfate reducing bacteria.

It has now been discovered that when small amounts of selected bactericides, named below, are used in water together with a small but synergistic adjuvant amount of hydrogen peroxide, that these bactericides become highly useful, and very effective, in the practice of the present invention, for killing all types of bacteria, microbes, fungi, yeast, and other like microorganisms, especially those found in well water, especially sulfate reducing and/or other anaerobic bacteria which successfully resists large amounts of the bactericides of the prior art.

One object of the present invention is to provide a novel additive for water for killing, reducing the number of and/or inhibiting the growth of bacteria in water.

Another object is to provide a novel aqueous liquid compound resistant to bacteria, and the like, comprising water and said additive.

Another object is to provide novel processes of treating wells with such water containing said additive.

Another object is to provide processes for producing oil and/or gas from sands containing the same by displacement by such water containing said additive, by water drive, water flooding, and/or repressuring such formations with such water.

Numerous other objects and advantages will be apparent to those skilled in the art upon reading the accompanying specification and claims.

It is proposed to produce water for commercial purposes by adding a selected bactericide named below, together with small but synergistic adjuvant amount of hydrogen peroxide. One process in which this water may be employed is in treating wells, such as washing the same with said water, or injecting the water into the permeable earth formations in the same which will accept water under pressure.

Furthermore, it is proposed to produce oil, and/or gas, where these hydrocarbons are found occurring in pervious earth formations either being found there naturally, or being stored there by artificial underground storage processes, by displacing the same with said water resistant to the growth of bacteria. This displacement may occur in several ways, either horizontally or vertically. In the case of horizontal displacement water is forced down an input well into the formation displacing the hydrocarbon into an output well spaced from the input well, from which the hydrocarbon is removed. In the case of a vertical displacement the treated water is injected through a well into the lower part of the hydrocarbon containing formation, and the hydrocarbon is removed from the upper portion thereof either through the same well from which the water was injected, or through another well, or wells, spaced therefrom.

All of these operations in wells are well known in the prior art, but in the prior art it has been found that after a while the sulfate reducing and/or other anaerobic bacteria found in the water employed causes such corrosion of equipment, and plugging of formations, that the process becomes inoperative. Expensive cleaning out with acids and replacement of equipment then becomes necessary before the process can be resumed, and even when resumed is never as effective as at the start. By inhibiting the growth of such bacteria by the practice of the present invention a new process is produced which may be continued indefinitely without cleanout with acids, or replacement of equipment.

The selected bactericides which are useful and effective in the practice of the present invention, for killing all types of bacteria, microbes, fungi, yeasts, and other like microorganisms, especially those found in well water, but especially for killing sulfate reducing and/or other anaerobic bacteria often found in water employed for oil recovery by water drive, or repressuring oil formations with water, are those consisting essentially of a small but bactericidal amount, preferably from 1 to 1,000 p.p.m. (parts per million), based on the volume of water to which it is added, of a bactericide selected from the group consisting of water dispersible and water soluble polyphenols, aliphatic polyphenols, salts of said phenols, and halogenated derivatives of said phenols and salts, alkyl quaternary ammonium salts, aliphatic amines, and salts of aliphatic amines, together with a small but synergistic adjuvant amount, preferably from 1 to 1,000 p.p.m., based on said volume of water, of hydrogen peroxide. The length of the aliphatic, or alkyl, radicals is most accurately defined, and most easily determined by those practicing the invention, as that giving a water dispersible or water soluble material, and it has been found that such is the case when these radicals have 20 carbon atoms or less, those with 5 to 20 being preferred.

The lower limit of 1 p.p.m. is effective in the practice of the invention when the bacterial count in the water to be treated is quite low, and can be employed when the water is substantially free of bacteria. The upper limit of 1,000 p.p.m. is set by economic considerations, as much smaller concentrations will kill the bacteria. As shown by data below 10 p.p.m. of hydrogen peroxide and 20 p.p.m. of one of the selected groups of bactericides is quite effective in most instances, and in commercial practice it would almost never be necessary to use more than 100 p.p.m. of both.

Specific examples of polyphenols useful in the invention of the preceding paragraph are bis phenol, tris phenol and chlorinated or other halogenated bis phenols and tris phenols such as 2,2'-methylene bis-4-chlorophenol, sodium pentachlorophenate and 2,2'-methylene bis-4-bromophenol. A polyphenol salt containing compound useful in said invention is "ET–5" a bactericide made by Dow Chemical Co., which is a liquid containing approximately 55% sodium salts of the reaction products between formaldehyde and monochlorinated phenols, therefore consisting essentially of, and having as its principal active ingredient said 2,2'-methylene bis-4-chlorophenol. Another polyphenol salt containing compound useful in this invention is "Dowicide F" a bactericide made by the same company as a 34% solution of sodium pentachlorophenate in ethylene glycol having the former as the active ingredient. Bis phenol and tris phenol are obtainable from the Of these alkyl quaternary ammonium salts, those having from 5 to 20 carbon atoms in the alkyl group, or in each alkyl group, as the case may be, are especially effective in this invention. The term "alkyl quaternary ammonium salt" covers both alkyl and dialkyl salts and mixtures of the same, as most "Arquads" are mixtures. The alkyl radical may be paraffinic, olefinic, diolefinic, acetylinic, or otherwise unsaturated.

For examples, dioctyl dimethylammonium chloride, didodecyl dimethylammonium chloride, dodecyl trimethylammonium chloride, dihexadecyl dimethylammonium chloride, hexadecyl trimethylammonium chloride, dioctadecyl dimethylammonium chloride, octadecyl trimethylammonium chloride, dioctadecenyl dimethylammonium chloride, dioctadecadienyl dimethylammonium chloride, hexadecyl octadecyl dimethylammonium chloride, octadecynyl trimethylammonium bromide, hexadecynyl trimethylammonium iodide, and octyl trimethylammonium fluoride, and mixtures of the same are all useful in this invention. Other water dispersible salts, such as the acetates, sulfates, nitrates, and phosphates, are effective in place of the chlorides, but the chlorides are preferred.

TABLE I

| "R" Groups | Carbon Chain Length | Arquads—Average composition | | | | | | |
|---|---|---|---|---|---|---|---|---|
| | | Arquad 12 | Arquad 16 | Arquad 18 | Arquad C | Arquad S | Arquad 2C | Arquad 2HT |
| Octyl | 8 | | | | 8% | | 8% | |
| Decyl | 10 | | | | 9% | | 9% | |
| Dodecyl | 12 | 90% | | | 47% | | 47% | |
| Tetradecyl | 14 | 9% | | | 18% | | 18% | |
| Hexadecyl | 16 | | 90% | 6% | 8% | 10% | 8% | 30% |
| Octadecyl | 18 | | 6% | 93% | 5% | 10% | 10% | 70% |
| Octadecenyl | 18 | 1% | 4% | 1% | 5% | 35% | | |
| Octadecadienyl | 18 | | | | | 45% | | |
| Active Ingredient | | 50% | 50% | 50% | 50% | 50% | 75% | 75% |
| NaCl (approx.) | | 1 | 1 | 1 | 1 | 1 | 1 | 1 |
| Isopropanol (approx.) | | 49 | 49 | 49 | 49 | 49 | 24 | 24 |
| Form at Room Temp | | Liquid | Semi-Liquid | Semi-Liquid | Semi-Liquid | Semi-Liquid | Liquid | Soft Paste |

NOTE.—"Arquads 2C and 2HT" are dialkyl dimethylammonium chlorides. All others are alkyl trimethyl ammonium chlorides.

General Aniline and Film Co. The other alkali metal salts, ammonium salts, and other water dispersible salts such as acetates, sulfates, nitrates and phosphates are effective in this invention.

Specific examples of alkyl quarternary ammonium salts useful in said invention are "Arquads" made by Armour and Company, which are alkyl and dialkyl quaternary ammonium salts, having respectively the general formulas as follows:

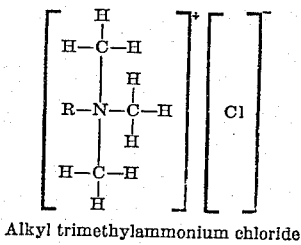

Alkyl trimethylammonium chloride

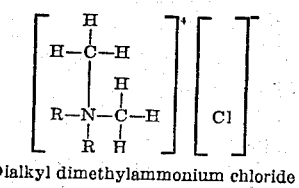

Dialkyl dimethylammonium chloride

A mixture of 1 part tallow trimethylammonium chloride and 1 part di-coconut dimethyl ammonium chloride in a 50% solution in propanol known as "Arquad T–2C" is very effective in the invention.

"Arquads 10, 16, C, S, 2C, 2HT, 2T, 2S, S2C and T2C" are effective in the invention, and are preferred.

Specific examples of aliphatic amines effective in this invention include aliphatic amines, for example decyl amine, dodecyl amine, tetradecyl amine, hexadecyl amine, octadecyl amine, octadecenyl amine, octadecadienyl amine, octadecenyl amine chloride, dodecyl amine bromide and dodecyl amine phosphate are effective in this invention, as are mixtures of the same; and aliphatic diamines and their water dispersible salts, such as the acetates, sulfates, nitrates, phosphates, and halogen salts, such as chlorides, bromides, iodides and fluorides, but the acetates and chlorides are preferred.

As examples of aliphatic amines, the "Armacs" made by Armour Chemical Division, which are effective in this invention, are acetate salts of aliphatic amines and may be represented as follows:

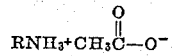

Preferably R represents an alkyl group ranging in length from 5 to 20 carbon atoms, and may be paraffinic, olefinic, diolefinic, acetylinic, or otherwise unsaturated.

"Armac C, 14, 16 and 18" are effective in this invention and are preferred. Decyl amine acetate. dodecyl amine acetate, tetradecyl amine acetate, hexadecyl amine acetate, octadecyl amine acetate, octadecenyl amine acetate, and octadecadienyl amine acetate, are effective in this invention, as are mixtures of the same.

The "Armacs" are generally mixtures of aliphatic amines as follows:

TABLE II

|  | No. of Carbon Atoms in Alkyl Group | | | | | | | | |
|---|---|---|---|---|---|---|---|---|---|
|  | Hexyl, 6 | Octyl, 8 | Decyl, 10 | Dodecyl, 12 | Tetra-decyl, 14 | Hexa-decyl, 16 | Octa-decyl, 18 Saturated | Octa-decenyl, 18 Mono-Unsat. | Octadeca-dienyl, 18 Poly-Unsat. |
| Armac 8 | 3 | 90 | 7 |  |  |  |  |  |  |
| Armac 8D | 3 | 90 | 7 |  |  |  |  |  |  |
| Armac 10 |  | 4 | 90 | 6 |  |  |  |  |  |
| Armac 10D |  | 4 | 90 | 6 |  |  |  |  |  |
| Armac 12D |  |  | 2 | 95 | 3 |  |  |  |  |
| Armac 14 |  |  |  | 4 | 92 | 4 |  |  |  |
| Armac 14D |  |  |  | 4 | 92 | 4 |  |  |  |
| Armac 16D |  |  |  |  |  | 92 | 7 | 1 |  |
| Armac 18 |  |  |  |  |  | 7 | 90 | 3 |  |
| Armac 18D |  |  |  |  |  | 7 | 90 | 3 |  |
| Armac HT |  |  |  |  |  | 25 | 72 | 3 |  |
| Armac HTD |  |  |  |  |  | 25 | 72 | 3 |  |
| Armac C |  | 8 | 9 | 47 | 18 | 8 | 5 | 5 |  |
| Armac CD |  | 8 | 9 | 47 | 18 | 8 | 5 | 5 |  |
| Armac T |  |  |  |  | 1 | 28 | 25 | 46 |  |
| Armac TD |  |  |  |  | 1 | 28 | 25 | 46 |  |
| Armac S |  |  |  |  |  | 20 | 17 | 26 | 37 |
| Armac SD |  |  |  |  |  | 20 | 17 | 26 | 37 |

As examples of aliphatic diamines, the "Duomeens" made by Armour Chemical Division, which are effective in this invention, are aliphatic diamines and may be represented as follows:

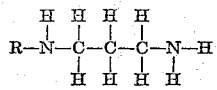

Preferably the alkyl radical R contains from 5 to 20 carbon atoms. "Duomeen C, S and T" are effective in this invention, and are preferred, as are combinations of the same with "Arquad S."

The quaternary salts and other water dispersible salts of said "Duomeens" are effective in the invention. Aliphatic amines may be reacted with alkyl halides to form quaternary salts, as follows:

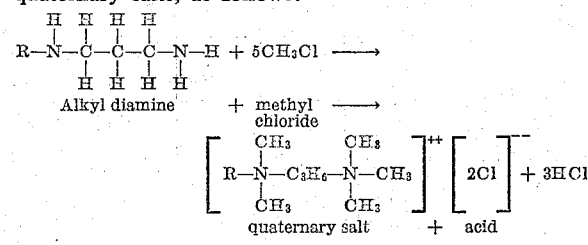

In place of this chloride, any halogen salt, such as bromide, iodide or fluoride is effective in this invention, as are the acetate, sulfate, nitrate and phosphate salts.

As specific examples of alkyl diamines, N hexyl N dimethyl N' trimethyl-1,3-diaminopropane, N octyl N dimethyl N' trimethyl-1,3-diaminopropane and N dodecyl N' trimethyl-1,3-diaminopropane are effective in this invention, and so is "Duomeen C," which is a mixture of these last three in which the alkyl radical R of the above formula comes from coconut oil, and any or all of their water dispersible salts, such as the chloride, acetate, sulfate, bromide, nitrate and phosphate salts.

The term aliphatic amines includes alkyl amines, dialkyl amines and trialkyl amines and quaternary amines and their salts which are all effective in this invention. They may be represented as follows:

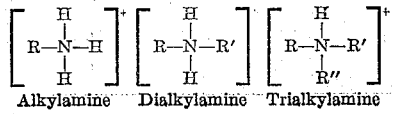

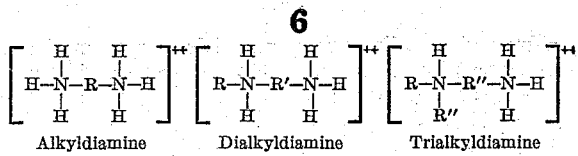

In the sets of formulas above R, R' and R" are the same or different alkyl radicals which preferably have from 5 to 20 carbon atoms.

As a specific example of a water dispersible salt of an alkyl diamine effective in this invention, "Duomeen T" diacetate is preferred, and is the quaternary diacetate salt of a tallow primary amine, having the formula:

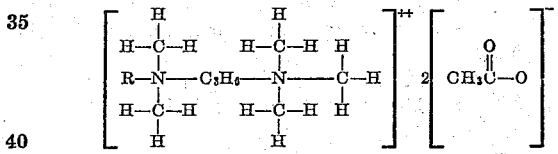

In the preceding formula the alkyl radical "R" comprises in different molecules generally the octadecyl and hexadecyl radicals from tallows.

Hydrogen peroxide has the well known formula $H_2O_2$, and either concentrated, or dilute, aqueous solutions of the same may be employed in the practice of this invention in the amounts claimed along with any of the above named chemical compounds, and has a synergistic adjuvant bactericidal effect independent of the concentration of the original source of hydrogen peroxide, or the presence or absence of the usual amounts of the usual hydrogen peroxide stabilizing agents generally employed in commercial aqueous solutions of hydrogen peroxide to preserve, and retard decomposition, of the same. Therefore, in commercial practice of this invention it is preferred to employ ordinary commercial aqueous solutions of 5% to 30% by weight hydrogen peroxide and they generally contain a litle acetanilide as a preservative. Tests with and without this amount of acetanilide in the hydrogen peroxide show such amounts of acetanilide have no effect on the synergistic effect of hydrogen peroxide in the present invention. In the following tests the hydrogen peroxide did not contain acetanilide, nor any other preservative, being a chemically pure grade of hydrogen peroxide aqueous solution, having the trade mark name "Superoxol" containing only 29% by weight hydrogen peroxide, less than 0.02% non-volatiles, and the remainder water. The non-volatiles are classified as less than:

0.01% $SO_4$
0.001% N
0.001% Cl
0.005% phosphate
0.005% $H_2SO_4$

None of these listed trace materials, nor all of them, in such small amounts, could have any appreciable bactericidal, or preservative effect, as is easily demonstrated by adding larger amounts of the same without appreciable effect.

One of the most significant facts brought out by the following data is that large amounts of 10 p.p.m. or greater of phenol alone, or hydrogen peroxide alone, or mixtures of phenol and hydrogen peroxide, had substantially no bactericidal effect against sulfate reducing bacteria even after long periods of time of 30 minutes or more. Therefore it is unexpected, and a synergistic adjuvant effect, that the addition of small amounts of hydrogen peroxide should greatly increase the bactericidal effect of the selected group of materials disclosed herein.

EXAMPLE

In order to give an example of the effectiveness of the invention a number of experimental runs have been made and the data from the same reported in Table III below for illustrative purposes.

Sulfate reducing bacteria were chosen for tests because these bacteria are the most difficult to control, and the strains of bacteria employed were secured from wells in which the most serious plugging conditions exist.

The sulfate reducing bacteria chosen for the tests reported in Table III below were taken from produced well water in a water injection system badly troubled by iron sulfide deposits from said bacteria in the North Burbank field. This well water was used to inoculate a suitable sulfate reducing bacteria culture medium, and the cultured colonies used to inoculate the solution of bactericidal compounds being tested.

The solutions of various strengths of bactericidal compounds being tested were made up with either some of said produced well water from said North Burbank field, or with fresh water.

Various concentrations of the compound under test are made up in 0.85 percent saline solution, and dispensed into one ounce dropping bottles. The droppers are graduated in units of 0.1 milliliter. The bottles are then inoculated with a five day actively growing broth culture of sulfate reducing bacteria. The incoulum should be sufficient to give a final count of 400,000 bacteria per milliliter in the bottle. This can again be determined with a bacteria counter and phase microscope. At intevals of 5, 10, 15 and 30 minutes, 0.1 milliliter aliquots are removed from the bottles and added to tubes of nutrient. All work is carried out at 25° C. and done in duplicate. The concentration of bactericide giving a 100 percent kill at a given time interval is indicated by the absence of any black colonies in the tube of nutrient after incubation for two weeks at 25° C. In all tests, a series of controls should be run using 0.85 percent saline solution inoculated with sulfate reducing bacteria.

To determine whether or not a bactericide will be effective in a given water, the test described in the previous paragraph is modified in the following manner. The bactericide under test is made up with water from the field rather than 0.85 percent saline solution. A strain of sulfate reducing bacteria is used that has been isolated from the water to be treated. The exposure time to the bactericide should be about the same as that to be used in the field, that is, 5, 10, 15 and 30 minutes, which is about the time it takes the water to travel from the point of bactericide injection to the input well. Finally the test should be conducted at the temperature of the water in the field, which is sometimes about 25° C. when used.

This test is used for both fresh and produced water.

In Table III the sub-heading "In the Burbank produced well water" means the solutions of various percentages of bactericides were all made up with water produced from the output wells of water flood unit NBU-138, a group of wells in the North Burbank unit, in the North Burbank field, which produced water is a dilute brine favorable to the multiplication of sulfate reducing bacteria.

TABLE III

Bactericidal Effect

AFTER 5 MINUTES
(In the Burbank produced well water)

| Run No. | Bactericide Compound | Amount of compound used in p.p.m. and black bacterial colony count after time given | | | | |
|---|---|---|---|---|---|---|
| | | 2.5 p.p.m. | 5 p.p.m. | 7.5 p.p.m. | 10 p.p.m. | 20 p.p.m. |
| 1 | $H_2O_2$ | 1,000 | 1,000 | 1,000 | 1,000 | 1,000 |
| 2 | Phenol | 1,000 | 1,000 | 1,000 | 1,000 | 1,000 |
| 3 | (Phenol plus 10 p.p.m. $H_2O_2$) | 1,000 | 1,000 | 1,000 | 1,000 | 1,000 |
| 4 | (Tris phenol) | 1,000 | 1,000 | 1,000 | 100 | 28 |
| 5 | (Tris phenol plus 10 p.p.m. $H_2O_2$) | 1,000 | 150 | 47 | 13 | 10 |
| 6 | ET-5 | 1,000 | 1,000 | 1,000 | 1,000 | 1,000 |
| 7 | (ET-5 plus 10 p.p.m. $H_2O_2$) | 1,000 | 1,000 | 1,000 | 1,000 | 150 |

(In fresh water)

| Run No. | Bactericide Compound | 2.5 p.p.m. | 5 p.p.m. | 7.5 p.p.m. | 10 p.p.m. | 20 p.p.m. |
|---|---|---|---|---|---|---|
| 8 | $H_2O_2$ | 1,000 | 1,000 | 1,000 | 1,000 | 1,000 |
| 9 | (Duomeen T diacetate) | 1,000 | 2 | 1 | 3 | |
| 10 | (Duomeen T Diacetate plus 10 p.p.m. $H_2O_2$) | 15 | 0 | 0 | 0 | |
| 11 | Arquad T-2C | 1,000 | 150 | | 15 | 15 |
| 12 | (Arquad T-2C plus 10 p.p.m. $H_2O_2$) | 1,000 | 0 | 1 | 0 | |

AFTER 10 MINUTES
(In the Burbank produced well water)

| Run No. | Bactericide Compound | 2.5 p.p.m. | 5 p.p.m. | 7.5 p.p.m. | 10 p.p.m. | 20 p.p.m. |
|---|---|---|---|---|---|---|
| 13 | $H_2O_2$ | 1,000 | 1,000 | 1,000 | 1,000 | 1,000 |
| 14 | Phenol | 1,000 | 1,000 | 1,000 | 1,000 | 1,000 |
| 15 | Phenol plus 10 p.p.m. $H_2O_2$ | 1,000 | 1,000 | 1,000 | 1,000 | 1,000 |
| 16 | Tris phenol | 1,000 | 1,000 | 1,000 | 75 | 13 |
| 17 | Tris phenol plus 10 p.p.m. $H_2O_2$ | 150 | 27 | 6 | 4 | 7 |
| 18 | ET-5 | 1,000 | 1,000 | 1,000 | 1,000 | 1,000 |
| 19 | ET-5 plus 10 p.p.m. $H_2O_2$ | 1,000 | 1,000 | 1,000 | 150 | 1 |

(In fresh water)

| Run No. | Bactericide Compound | 2.5 p.p.m. | 5 p.p.m. | 7.5 p.p.m. | 10 p.p.m. | 20 p.p.m. |
|---|---|---|---|---|---|---|
| 20 | $H_2O_2$ | 1,000 | 1,000 | 1,000 | 1,000 | |
| 21 | Duomeen T diacetate | 1 | 0 | 0 | 0 | |
| 22 | Duomeen T diacetate plus 10 p.p.m. $H_2O_2$ | 0 | 1 | 0 | 0 | |
| 23 | Arquad T-2C | 75 | 35 | | 1 | 15 |
| 24 | Arquad T-2C plus 10 p.p.m. $H_2O_2$ | 6 | 1 | 0 | 0 | |

AFTER 15 MINUTES
(In the Burbank produced well water)

| | | | | | | |
|---|---|---|---|---|---|---|
| 25 | H₂O₂ | 1,000 | 1,000 | 1,000 | 1,000 | 150 |
| 26 | Phenol | 1,000 | 1,000 | 1,000 | 1,000 | 1,000 |
| 27 | Phenol plus 10 p.p.m. H₂O₂ | 1,000 | 1,000 | 1,000 | 1,000 | 1,000 |
| 28 | Tris phenol | 1,000 | 1,000 | 150 | 50 | 17 |
| 29 | Tris phenol plus 10 p.p.m. H₂O₂ | 23 | 15 | 0 | 2 | 0 |
| 30 | ET-5 | 1,000 | 1,000 | 1,000 | 1,000 | 100 |
| 31 | ET-5 plus 10 p.p.m. H₂O₂ | 1,000 | 1,000 | 100 | 8 | 0 |

(In fresh water)

| | | | | | | |
|---|---|---|---|---|---|---|
| 32 | H₂O₂ | 1,000 | 1,000 | 1,000 | 1,000 | |
| 33 | Duomeen T diacetate | 0 | 0 | 2 | 1 | |
| 34 | Duomeen T diacetate plus 10 p.p.m. H₂O₂ | 0 | 0 | 0 | 0 | |
| 35 | Arquad T-2C | 25 | 10 | | 0 | ¹ 15 |
| 36 | Arquad T-2C plus 10 p.p.m. H₂O₂ | 0 | 0 | 0 | 0 | |

AFTER 30 MINUTES
(In the Burbank produced well water)

| | | | | | | |
|---|---|---|---|---|---|---|
| 37 | H₂O₂ | 1,000 | 1,000 | 1,000 | 1,000 | 9 |
| 38 | Phenol | 1,000 | 1,000 | 1,000 | 1,000 | 1,000 |
| 39 | Phenol plus 10 p.p.m. H₂O₂ | 1,000 | 1,000 | 1,000 | 1,000 | 1,000 |
| 40 | Tris phenol | 100 | 75 | 40 | 23 | 12 |
| 41 | Tris phenol plus 10 p.p.m. H₂O¹ | 1 | 0 | 0 | 0 | 0 |
| 42 | ET-5 | 1,000 | 1,000 | 150 | 100 | 28 |
| 43 | ET-5 plus 10 p.p.m. H₂O₂ | 150 | 100 | 0 | 0 | 0 |
| 44 | F | 1,000 | 1,000 | 1,000 | 1,000 | 1,000 |
| 45 | F plus 10 p.p.m. H₂O₂ | 1,000 | 1,000 | 1,000 | 150 | 150 |

¹ Believed caused by later accidental contamination.

In the above Table III, the count is the number of colonies of bacteria, each containing one to as many as would be in a control tube with no bactericide treatment at all, which would be about 1,000 to 3,000 organisms, as counted with the usual bacteria colony counter. Where the count is 1,000 it means 1,000 or more.

In the above Table III, "H₂O₂" is chemically pure grade aqueous solution of 29% by weight hydrogen peroxide, tris phenol is from the General Aniline and Film Co., "ET-5" is 2,2' methylene bis-4-chlorophenol, "Duomeen T" diacetate is a diacetate salt of a tallow primary amine, "Arquad T-2C" is a 1 to 1 mixture of tallow trimethyl ammonium chloride and di-coconut dimethyl ammonium chloride as a 50% solution in propanol-2 (said propanol being inert as a bactericide as employed), and "F" is sodium pentachlorophenate 34% solution in ethylene glycol (said glycol having no bactericidal effect as employed).

In runs 1, 8, 13, 20, 25, 32, and 37 the amounts of hydrogen peroxide varied from 2.5 to 20 p.p.m. as indicated at the head of the respective column, but in all other runs containing hydrogen peroxide as indicated only had 10 p.p.m. while the other bactericide varied from 2.5 to 20 p.p.m.

While certain compounds have been named and certain data given for purposes of illustration, the invention obviously is not limited thereto.

Having described my invention, I claim:

1. A bactericidal liquid resistant to the formation of colonies of anaerobic bacteria, comprising a major amount of water, and in parts per million of the volume of said water, 2.5 to 20 p.p.m. of an aqueous solution of 29% by weight hydrogen peroxide and 2.5 to 20 p.p.m. of an amine bactericide selected from the group consisting of water dispersible and water soluble saturated completely acyclic tetraalkyl quaternary ammonium halide salts in which the alkyl groups are all attached to the nitrogen atom, and acetate salts of saturated acyclic amines, in which the alkyl and the acyclic radicals have from 5 to 20 carbon atoms each.

2. A bactericidal liquid resistant to the formation of colonies of anaerobic bacteria, comprising a major amount of water, and in parts per million of the volume of said water, 2.5 to 20 p.p.m. of an aqueous solution of 29% by weight hydrogen peroxide and 2.5 to 20 p.p.m. of a quaternary diacetate salt of a tallow primary amine.

3. A bactericidal liquid resistant to the formation of colonies of anaerobic bacteria, comprising a major amount of water, and in parts per million of the volume of said water, 2.5 to 20 p.p.m. of an aqueous solution of 29% by weight hydrogen peroxide and 2.5 to 20 p.p.m. of a mixture of one part tallow trimethyl ammonium chloride and one part di-coconut dimethyl ammonium chloride, both combined as a 50% solution in an inert solvent.

4. The process of treating a well comprising pumping down said well into the permeable earth formations therein, the composition of claim 1.

5. The process of treating a well comprising pumping down said well into the permeable earth formations therein, the composition of claim 2.

6. The process of treating a well comprising pumping down said well into the permeable earth formations therein, the composition of claim 3.

References Cited in the file of this patent

UNITED STATES PATENTS

| | | |
|---|---|---|
| 2,105,835 | Krause | Jan. 18, 1938 |
| 2,375,854 | Kirby | May 15, 1945 |
| 2,420,099 | Salle et al. | May 6, 1947 |
| 2,692,231 | Stayner et al. | Oct. 19, 1954 |
| 2,798,046 | Beaver et al. | July 2, 1957 |

FOREIGN PATENTS

| | | |
|---|---|---|
| 604,277 | Great Britain | July 1, 1948 |

OTHER REFERENCES

Wadley: The Evid. Required to Show Synergistic Action of Insect and a Short Cut in Analysis, USDA, June 1955.